(12) United States Patent
Petersen

(10) Patent No.: US 7,005,764 B2
(45) Date of Patent: Feb. 28, 2006

(54) ELECTRODYNAMIC APPARATUS AND METHOD OF MANUFACTURE

(75) Inventor: Christian C. Petersen, Sandwich, MA (US)

(73) Assignee: Petersen Technology Corporation, Bourne, MA (US)

(*) Notice: Subject to any disclaimer, the term of this patent is extended or adjusted under 35 U.S.C. 154(b) by 37 days.

(21) Appl. No.: 10/747,538

(22) Filed: Dec. 29, 2003

(65) Prior Publication Data

US 2005/0140241 A1    Jun. 30, 2005

(51) Int. Cl.
H02K 15/12    (2006.01)

(52) U.S. Cl. .................. 310/44; 310/112; 310/259; 310/216

(58) Field of Classification Search ............ 310/43–45, 310/112, 216–218, 254, 258, 259
See application file for complete search history.

(56) References Cited

U.S. PATENT DOCUMENTS

| 4,134,054 | A | * | 1/1979 | Akamatsu | 318/685 |
|---|---|---|---|---|---|
| 4,255,684 | A | * | 3/1981 | Mischler et al. | 310/216 |
| 4,503,368 | A | * | 3/1985 | Sakamoto | 310/49 R |
| 4,833,355 | A | * | 5/1989 | Kawashima | 310/198 |
| 4,947,065 | A | * | 8/1990 | Ward et al. | 310/44 |
| 5,086,245 | A | * | 2/1992 | Sieja et al. | 310/216 |
| 5,105,115 | A | | 4/1992 | Shinryo et al. | |
| 5,519,270 | A | | 5/1996 | Yamada et al. | |
| 5,536,985 | A | | 7/1996 | Ward et al. | |
| 5,798,583 | A | * | 8/1998 | Morita | 310/42 |
| 5,952,758 | A | * | 9/1999 | Lucidarme et al. | 310/162 |
| 6,232,681 | B1 | | 5/2001 | Johnston et al. | |

* cited by examiner

*Primary Examiner*—Dang Le
(74) *Attorney, Agent, or Firm*—Mueller and Smith, LPA

(57) ABSTRACT

Electrodynamic apparatus such as a motor, generator or alternator is configured having a stator core assembly formed of pressure shaped processed ferromagnetic particles which are pressure molded in the form of stator modules. These generally identical stator modules are paired with or without intermediate modules to provide the stator core structure for receiving field winding components. In one embodiment, two sets of the paired stator modules are combined in tandem to enhance operational functions without substantial diametric increases in the overall apparatus.

39 Claims, 7 Drawing Sheets

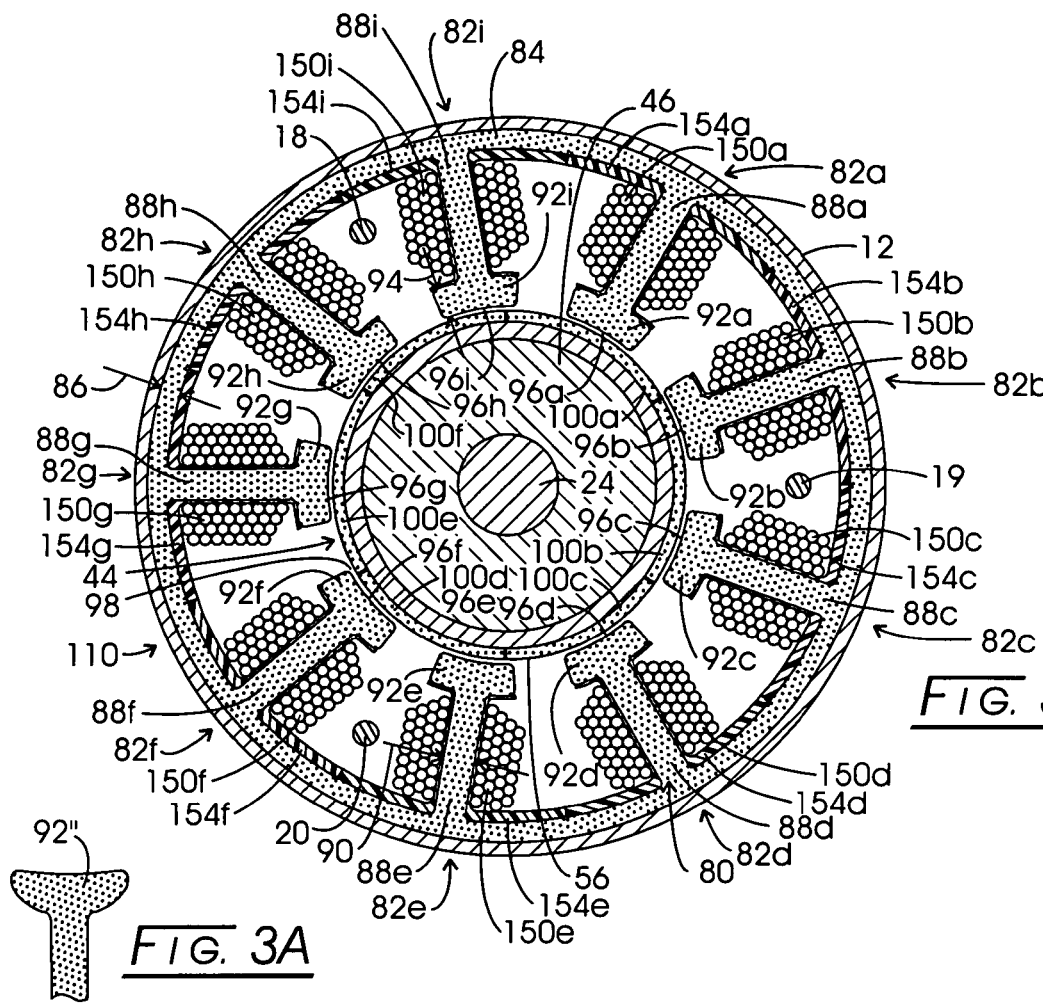
FIG. 3
FIG. 3A
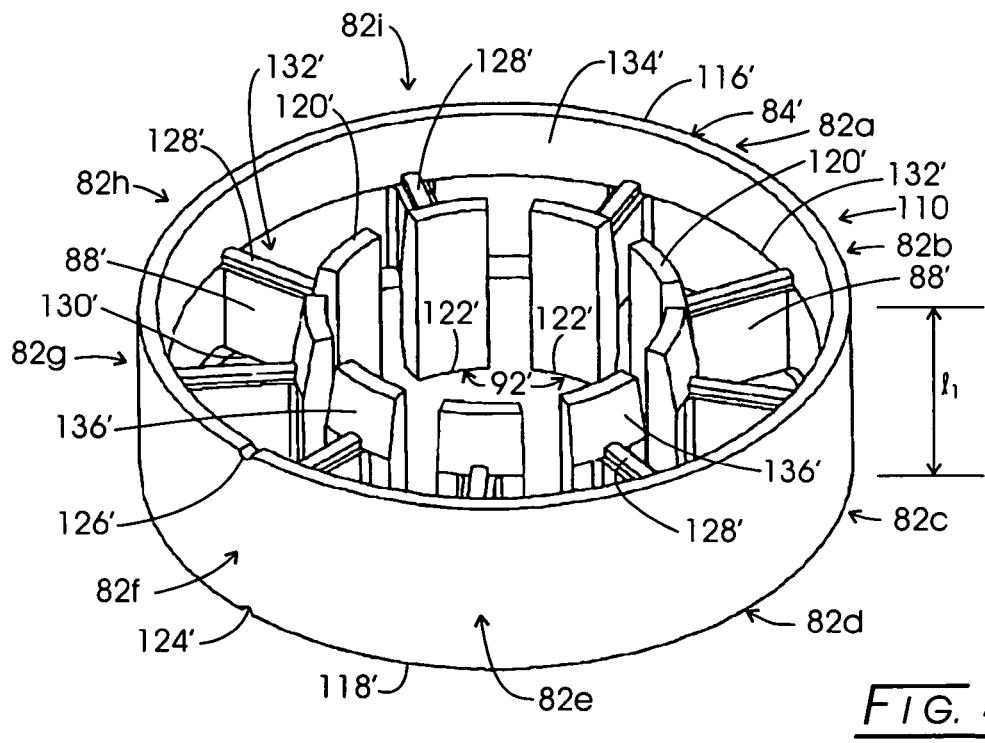
FIG. 4

ELECTRODYNAMIC APPARATUS AND METHOD OF MANUFACTURE

CROSS-REFERENCE TO RELATED APPLICATIONS

STATEMENT REGARDING FEDERALLY SPONSORED RESEARCH

Not applicable.

BACKGROUND OF THE INVENTION

Investigators in the electric motor arts have been called upon to significantly expand motor technology from its somewhat static status of many decades. Improved motor performance particularly has been called for in such technical venues as computer design and secondary motorized systems carried by vehicles, for example, in the automotive and aircraft fields. With progress in these fields, classically designed electric motors, for example, utilizing brush-based commutation, have been found to be unacceptable or, at best, marginal performers.

From the time of its early formation, the computer industry has employed brushless d.c. motors for its magnetic memory systems. The electric motors initially utilized for these drives were relatively expensive and incorporated a variety of refinements, for instance as necessitated with the introduction of rotating disc memory. Over the recent past, the computer industry has called for very low profile motors capable of performing in conjunction with very small disc systems and at substantially elevated speeds.

Petersen, in U.S. Pat. No. 4,745,345, entitled "D.C. Motor with Axially Disposed Working Flux Gap", issued May 17, 1988, describes a PM d.c. motor of a brushless variety employing a rotor-stator pole architecture wherein the working flux gap is disposed "axially" with the transfer of flux being in parallel with the axis of rotation of the motor. This "axial" architecture further employs the use of field windings which are simply structured, being supported from stator pole core members, which, in turn, are mounted upon a magnetically permeable base. The windings positioned over the stator pole core members advantageously may be developed upon simple bobbins insertable over the upstanding pole core members. Such axial type motors have exhibited excellent dynamic performance and efficiency and, ideally, may be designed to assume very small and desirably variable configurations.

Petersen in U.S. Pat. No. 4,949,000, entitled "D.C. Motor", issued Aug. 14, 1990 describes a d.c. motor for computer applications with an axial magnetic architecture wherein the axial forces which are induced by the permanent magnet based rotor are substantially eliminated through the employment of axially polarized rotor magnets in a shear form of flux transfer relationship with the steel core components of the stator poles. The dynamic tangentially directed vector force output (torque) of the resultant motor is highly regular or smooth lending such motor designs to numerous high level technological applications such as computer disc drives which require both design flexibility, volumetric efficiency, low audible noise, and a very smooth torque output.

Petersen et al, in U.S. Pat. No. 4,837,474 entitled "D.C. Motor", issued Jun. 6, 1989, describes a brushless PM d.c. motor in which the permanent magnets thereof are provided as arcuate segments which rotate about a circular locus of core component defining pole assemblies. The paired permanent magnets are magnetized in a radial polar sense and interact without back iron in radial fashion with three core components of each pole assembly which include a centrally disposed core component extending within a channel between the magnet pairs and to adjacently inwardly and outwardly disposed core components also interacting with the permanent magnet radially disposed surface. With the arrangement, localized rotor balancing is achieved and, additionally, discrete or localized magnetic circuits are developed with respect to the association of each permanent magnet pair with the pole assembly.

Petersen in U.S. Pat. No. 5,659,217, issued Aug. 19, 1997 and entitled "Permanent Magnet D.C. Motor Having Radially-Disposed Working Flux-Gap" describes a PM d.c. brushless motor which is producible at practical cost levels commensurate with the incorporation of the motors into products intended for the consumer marketplace. These motors exhibit a highly desirable heat dissipation characteristic and provide improved torque output in consequence of a relatively high ratio of the radius from the motor axis to its working gap with respect to the corresponding radius to the motors' outer periphery. The torque performance is achieved with the design even though lower cost or, lower energy product permanent magnets may be employed with the motors. See also: Petersen, U.S. Pat. No. 5,874,796, issued Feb. 23, 1999.

The above-discussed PM d,c, motors achieve their quite efficient and desirable performance in conjunction with a multiphase-based rotational control. This term "multiphase" is intended to mean at least three phases in conjunction with either a unipolar or bipolar stator coil excitation. Identification of these phases in conjunction with rotor position to derive a necessary controlling sequence of phase transitions traditionally has been carried out with two or more rotor position sensors. By contrast, simple, time domain-based multiphase switching has been considered to be unreliable and impractical since the rotation of the rotor varies in terms of speed under load as well as in consequence of a variety of environ mental conditions.

Petersen in application for U.S. patent Ser. No. 10/706, 412, filed Nov. 12, 2003, entitled "Multiphase Motors With Single Point Sensing Based Commutation" describes a simplified method and system for control of multiphase motors wherein a single sensor is employed with an associated sensible system to establish reliable phase commutation sequencing.

Over the years of development of what may be referred to as the Petersen motor technology, greatly improved motor design flexibility has been realized. Designers of a broad variety of motor driven products including household implements and appliances, tools, pumps, fans and the like as well as more complex systems such as disc drives now are afforded an expanded configuration flexibility utilizing the new brushless motor systems. No longer are such designers limited to the essentially "off-the-shelf" motor varieties as listed in the catalogues of motor manufacturers. Now, motor designs may become components of and compliment the product itself in an expanded system design approach.

During the recent past, considerable interest has been manifested by motor designers in the utilization of magnetically "soft" processed ferromagnetic particles in conjunction with pressed powder technology as a substitute for the conventional laminar steel core components of motors. So structured, when utilized as a motor stator core component, the product can exhibit very low eddy current loss which represents a highly desirable feature, particularly as higher motor speeds and resultant core switching speeds are called for. As a further advantage, for example, in the control of cost, the pressed powder assemblies may be net shaped wherein many intermediate manufacturing steps and quality considerations are avoided. Also, tooling costs associated with this pressed powder fabrication are substantially lower as compared with the corresponding tooling required for typical laminated steel fabrication. The desirable net shaping pressing approach provides a resultant magnetic particle structure that is 3-dimensional magnetically (isotropic) and avoids the difficulties encountered in the somewhat two-dimensional magnetic structure world of laminations. See generally U.S. Pat. No. 5,874,796 (supra).

The high promise of pressed powder components for motors and generators initially was considered compromised by a characteristic of the material wherein it exhibits relatively low permeability. However, Petersen, in U.S. Pat. No. 6,441,530, issued Aug. 27, 2000 entitled "D.C. PM Motor With A Stator Core Assembly Formed Of Pressure Shaped Processed Ferromagnetic Particles", describes an improved architecture for pressed powder formed stators which accommodates for the above-noted lower permeability characteristics by maximizing field coupling efficiencies.

As the development of pressed powder stator structures for electrodynamic devices such as motors and generators has progressed, investigators have undertaken the design of larger, higher power systems. This necessarily has lead to a concomitant call for larger press molded structures. The associated molding process calls for press pressures adequate to evolve requisite material densities to gain adequate electrical properties. To achieve those densities, press pressures are needed in the 40 tons per square inch to 50 tons per square inch range. As a consequence the powdered metal pressing industry suggest that the design of molded parts exhibit aspect ratios (width or thickness to length in the direction of pressing) equal to or less than about 1:5. Thus as the length of stator core component structures increase, their thickness must increase to an extent that a resultant shape becomes so enlarged in widthwise cross section as to defeat the design goal, with attendant loss of both the economies of cost and enhanced performance associated with this emerging pressed powder technology.

BRIEF SUMMARY OF THE INVENTION

The present invention is addressed to electrodynamic apparatus and a method of manufacturing the stator core assemblies thereof utilizing pressed powder technologies wherein requisite stator core material densities are achieved while part thicknesses and volumes are retained within desirable dimensional limits. Requisite ratios of component widths or thicknesses to corresponding lengths are maintained in proper combinations while minimizing thicknesses of core structures through the employment of two or more stator core modules or components which, following their press forming, are selectively combined to define a sequence of module core components over which field windings are positioned. Because the stator core modules may be geometrically identical, tooling costs may be conserved through employment, in effect, of a single mold to produce them.

In one embodiment of the invention, paired stator core modules are combined in tandem along the axis of the electrodynamic apparatus to achieve an enhanced functional capacity while minimizing the diametric extent of the device within which they perform. With this arrangement, two or more sets of phase defining field windings are utilized with wire diameters of smaller extent. These phase defining windings advantageously then may be combined for simultaneous excitation through employment of a series or parallel electrical interconnection.

Where stator assembly sizes are called for which are large, the stator core modules may be press formed in segmented fashion. The resulting segments then may be combined in mutually abutting fashion to form the stator modules. Further, the configuration of these segments may be selected such that segments otherwise aligned within paired stator modules can be pre-wound with field winding elements prior to being abuttably joined together.

A convenient feature of the stator assemblies resides in the utilization of electrically insulative shields positioned over the mutually outwardly disposed winding support surfaces of field winding core portions of the stator pole core member. In general, the pole core members are formed with wire receiver troughs within which field windings are retained. To facilitate the circuit association of the windings from pole-to-pole within the stator assembly, the insulative shield may be configured to extend outwardly to define an outwardly open wire receiving channel adjacent the inner surface of an associated back iron region of the stator structure. The stator structures revealed in the embodiments presented herein are all shown in the classical inward facing salient stator pole configuration. This should not be considered a limitation as U.S. Pat. No. 6,441,530 (supra) illustrates both inward and outward facing stators and is incorporated by reference herewith.

Other objects of the invention will, in part, be obvious and will, in part, appear hereinafter.

The invention, accordingly, comprises the apparatus and method possessing the construction, combination of elements, arrangement of parts and steps which are exemplified in the following detailed description.

For a fuller understanding of the nature and objects of the invention, reference should be made to the following detailed description taken in connection with the accompanying drawings.

BRIEF DESCRIPTION OF THE DRAWINGS

FIG. 3 is a sectional view taken through the plane 3—3 shown in FIG. 2;

FIG. 3A is a partial top view of an alternate configuration for a core member flux interaction region;

FIG. 4 is a perspective view of a core component configured in accordance with the invention;

DETAILED DESCRIPTION OF THE INVENTION

In the discourse to follow radially salient pole stator structures and the techniques of their formation and assembly are described in conjunction with d.c. PM motors having an architecture for deriving relatively higher power outputs, for example, about 250 watts and above. The structuring and techniques apply additionally to other forms of motors such as double salient pole motors and to electricity generators. Thus, the term "electrodynamic apparatus" is utilized with the meaning that it incorporates motors and generators employing the noted techniques of stator formation. In developing such electrodynamic devices utilizing magnetically soft composite pressed powder technology for stator construction the developer will establish a variety of dimensional parameters for electrical reasons establishing, for instance, appropriate material thicknesses to achieve flux transfer and avoidance of saturation. These electrical criteria are generated by calculation. When those requisite thicknesses are so established with judicious safety factors, the utilization of pressed powder material above and beyond those thicknesses will contribute only to weight and cost without improvement in device performance. Once these dimensional parameters are established, then the developer is confronted with the mandates of the powder metal pressing industry requiring molded part aspect ratios calling for structural thicknesses well beyond those necessary for electrical performance criteria.

Figure 1:
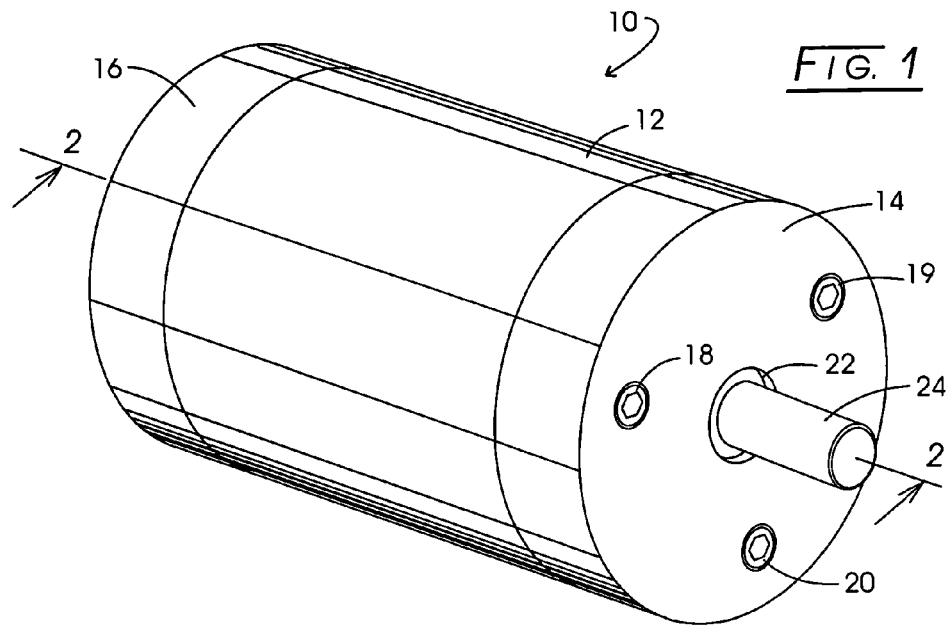
FIG. 1 is a perspective view of electrodynamic apparatus incorporating the features of the invention.

Looking to FIG. 1, a d.c. PM motor configured according to the precepts of the invention is represented generally at 10. Motor 10 is formed with a cylindrical outer sleeve 12 formed, for example, of aluminum or plastic to which is connected cylindrical end caps 14 and 16. These caps 14 and 16 are retained in place by three hex head machine screws 18–20. Extending from an opening 22 within end cap 14 is a rotor shaft 24.

Figure 2:
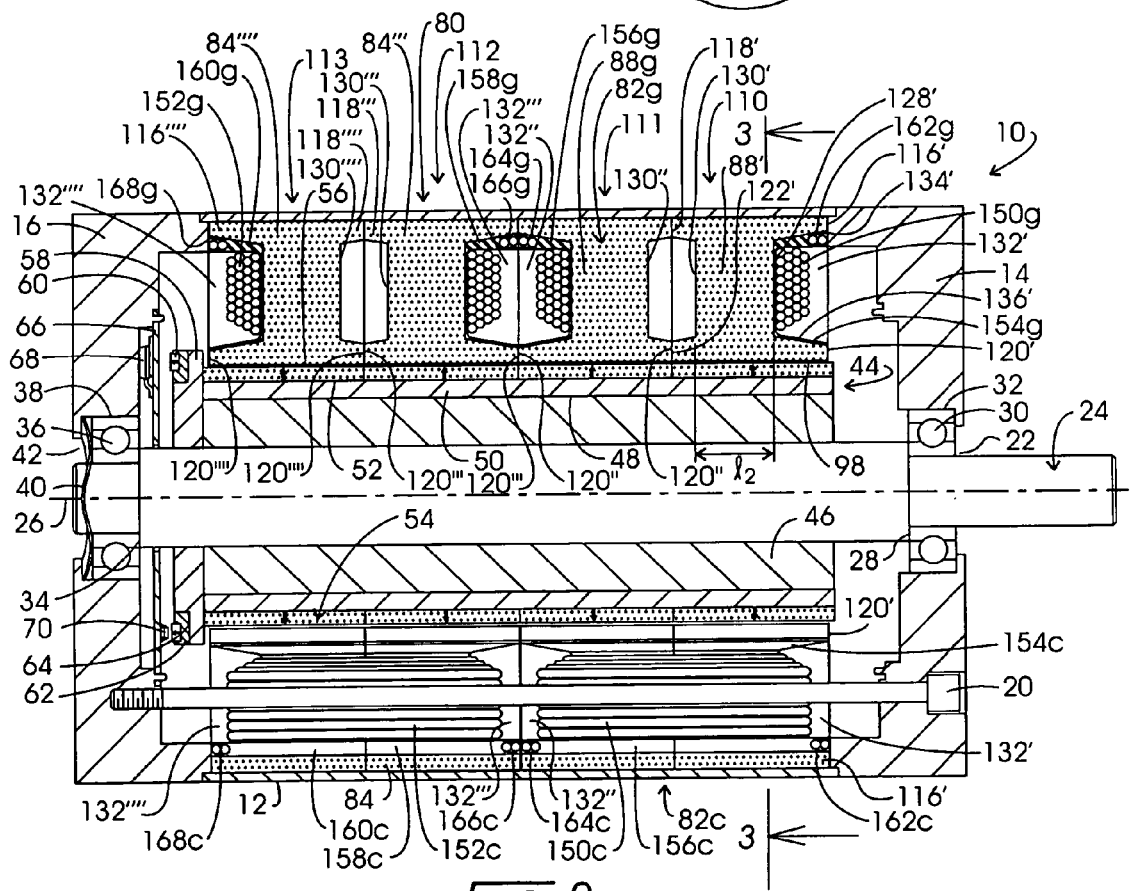
FIG. 2 is a sectional view taken through the plane 2—2 shown in FIG. 1.

Referring to FIG. 2, device 10 is revealed in section. Rotor shaft 24 is seen disposed symmetrically about a rotor axis 26. The shaft 24 is necked down to define an annular shoulder 28 which engages the inner race of a ball bearing 30, which in turn, is seated within a cylindrical bearing cavity 32 formed within end cap 14. In similar fashion, the opposite end of shaft 24 is necked down to define an annular shoulder 34 which abuttably engages the inner race of a ball bearing 36. The outer race of ball bearing 36, in turn, is biased inwardly by a wavy washer 40 interposed between bearing 36 and bearing cavity surface 42.

Shaft 24 supports a rotor represented generally at 44 which is formed having a cylindrical core 46 formed of aluminum extending to an outer cylindrical surface 48. Coupled with that surface 48 is a cylindrical back iron 50 formed of ferrous material and extending to a cylindrical back iron surface 52. Surface 52, in turn, supports a cylindrical radially magnetized permanent magnet 54 which extends to flux confronting surfaces 56. Those flux confronting surfaces provide, in this embodiment, a sequence of six magnetic regions of alternating polarity generally extending in parallel with the rotor axis 26.

Additionally supported for rotation upon shaft 24 is a polymeric annular disc 58 which rotationally supports an annularly-shaped sequence of sensible system permanent magnets shown in cross section at 60. The annular magnets sequence 60 is shown mounted within an annular steel back iron 62 supported, in turn, upon an annular shoulder 64 formed within disc 58. Mounted internally upon end cap 16 is a printed circuit board 66 which functions to carry an integrated circuit 68 along with appropriate driver transistors and one or more Hall effect sensors as shown at 70. Sensor 70 is positioned for magnetic field response to the magnetic regions of sensible system magnet 60.

An annular stator assembly is represented generally at 80. Assembly 80 is formed using a material composed of magnetically soft pressure shaped processed ferromagnetic particles which are generally mutually insulatively associated. These materials such as Somaloy 500, are sometimes referred to as involving soft magnetic composite technology and are marketed, inter alia, by North American Hoganas, Inc. of Hollsopple, Pa. Assembly 80 is configured as a radial salient pole stator having nine, angularly spaced apart identical stator pole core members. Looking additionally to FIG. 3, these core members are represented in general at 82a–82i. Core members 82a–82i are formed integrally with and extend radially inwardly from a portion of a cylindrically shaped back iron 84 having a widthwise extent identified by paired arrows 86. Extending radially inwardly from back iron 84 are nine winding core portions 88a–88i of the stator pole core members. The widthwise dimension or thickness of these winding core portions 88a–88i are identified at paired arrows 90. Winding core portions 88a–88i extend radially inwardly to respective integrally formed flux interaction portions 92a–92i. The widthwise extent or thickness of these flux interaction portions is represented at paired arrows 94. Depending on the arc length of the flux interaction portions relative to the widthwise extent of the winding core portions the flux interaction portions on 92a–i on either side of the widthwise extent of the winding core portions may be tapered to a lesser widthwise extent at the extremes of its arcuate extent as shown in FIG. 3A. These flux interaction portions extend to respective arcuate flux interaction surfaces 96a–96i which are spaced from flux confronting surface 56 of rotor 44 to define a functioning or working gap 98. Regions as at 92" are more typical when the air gap between adjacent stator pole tips is less than twice the distance from the flux interaction surface to the magnet back iron. FIG. 3 reveals that the permanent magnet feature of rotor 44 is formed with six magnetic regions extending along the motor axis. These regions are identified at 100a–100f.

Core members 82a–82i and back iron 84 are not formed as a unitary part in their axial plane. Were they to be so formed, the widthwise dimensions required to meet the pressing criteria for pressure shaped processed ferromagnetic particles would increase significantly causing the resulting structure to be less desirable for its intended electrodynamic function. In accordance with the precepts of the invention, the back iron and core members are constructed, for the instant embodiment, as four identically structured modules, each of which is formed meeting press forming criteria and optimum electrical criteria. In this regard, the ratio of each of the noted predetermined widthwise or thickness dimensions with respect to their length in the direction of pressing is equal to or less than a ratio of about 1 to 5. Looking to FIG. 4, a perspective view of the uppermost one of these modules is represented in general at 110. In the following descriptions top and bottom surfaces of a stator module or component such as seen in perspective in FIG. 4 are defined as the axial end surfaces of each component. In an assembly of components these surfaces form outward facing and inward facing surfaces of an electrodynamic device. In general, the term "bottom is used in an inward sense, and the term "top" is used in an outward sense. The terms "component" or "module" as used herein are intended to mean not only identical components but components having different configurations, for instance, with stator core portions made from different molds. Module 110 is formed with a back iron portion 84' which extends from a back iron top surface region 116' a predetermined length $l_1$ (press direction), to a back iron bottom surface region 118'. That length, $l_1$, is determined with respect to the wall thickness regions 86, 90 and 94 and noted high pressure pressing criteria. In similar fashion, the flux interaction portions, which are now identified generally at 92', for module 110 extend from flux interaction top surface regions certain of which are identified at 120' and extend the same length, $l_1$, to a flux interaction bottom surface region is which identified at 122'. As revealed in FIGS. 2 and 4, back iron top surface region 116' and flux interaction top surface region 120' reside in a common plane which is perpendicular to the axis 26. In similar fashion, back iron bottom surface region 118' and flux interaction bottom surface region 122' reside in a common plane which is parallel with the top surface region common plane. FIG. 4 also reveals the presence of top and bottom alignment notches shown respectively at 124' and 126'.

Certain of the winding core portions of module 110 are identified in general in FIG. 4 at 88'. Looking additionally to FIG. 2, these winding core portions 88' extend from a winding core top surface region certain of which are identified at 128' a length $I_2$ to a winding core bottom surface region certain of which are revealed at 130'. FIG. 4 reveals that the winding core top surface regions 128' reside in a common plane and that the edges thereof are chamfered to facilitate the mounting of field winding wire thereover. In contrast, the winding core bottom surface regions 130' need not be chamfered inasmuch as they will be seen not to receive or support field winding wire. FIGS. 2 and 4 further reveal that the winding core top surface regions 128' are recessed inwardly from the back iron top surface regions 116' and flux interaction top surface regions 120' to define receiver troughs certain of which are identified at 132'. Receiver troughs 132' further are defined by a radially inwardly sloping surface 134' formed within the module back iron portion 84'. In similar fashion, a radially outward sloping surface, certain of which are identified at 136' is formed in each of the stator pole core member flux interaction portions.

Figure 5:
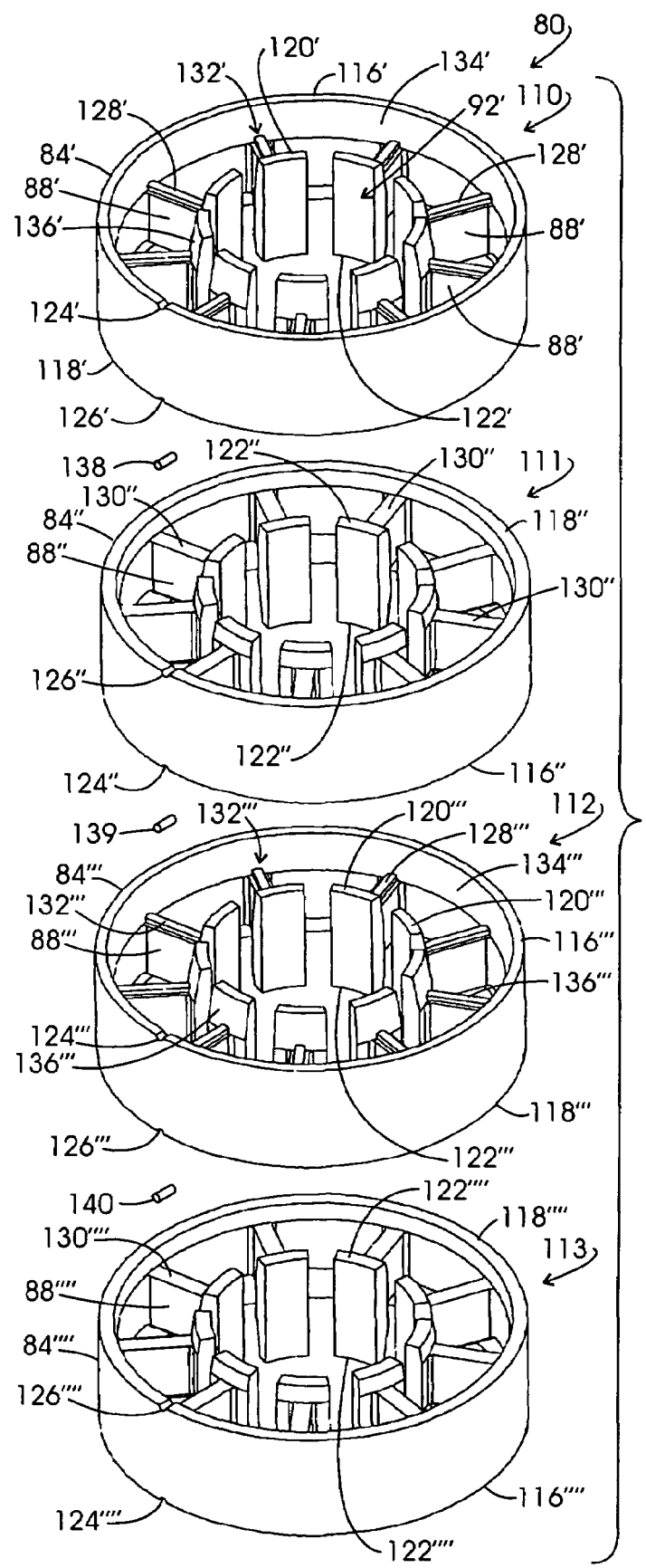
FIG. 5 is an exploded view showing a combination of four of the components shown in FIG. 4.

Looking additionally to FIG. 5, it may be observed that stator assembly 80 is configured with four modules which are shown as being identified for illustrative purposes and thus are configured as described in conjunction with FIG. 4. Accordingly, not only do the modules have dimensional aspect ratios which permit their compression molding and practical shapes, but also they are economically fabricable inasmuch as for the present embodiment a singular molding tool is employed. The four modules are revealed in FIGS. 2 and 5 at 110–113. To facilitate the identification of the identical portions of these modules, such elements are numerically identified in the same fashion as provided in FIG. 4 but with priming provided for modules 110 through 113 respectively extending from a single prime to four primes. Modules 111 and 112 may be referred to as medial modules with medial stator pole core members of medial dimensions. Note in FIG. 5 that modules 110 and 111 are paired such that, for example, the back iron top surface regions 116' and 116" as well as the corresponding flux interaction top surface regions 120' and 120" face mutually outwardly. The same mutual orientation is provided in conjunction with components 112 and 113. Mutual angular alignment or slight misalignment of all of the modules 110–113 is provided by three alignment pins 138–140. In this regard, alignment pin 138 engages notches 126' and 126". Aligning pin 139 engages notches 124" and 124''', and alignment pin 140 engages notches 126''' and 126''''.

Returning to FIG. 2, modules 110–113 are retained in mutual abutment and alignment by combination of cylindrical sleeve 12, end caps 14 and 16 and their mutual coupling by machine screws 18–20. For the device design at hand, a mutual contacting abutment between paired modules as at 110 and 111 or 112 and 113 is not a requisite arrangement. In this regard, the paired components will perform appropriately if slightly separated in an axial sense with shock absorbing materials or the like.

FIG. 2 illustrates, inter alia, stator pole core member 82g in section as well as a non-sectional view of core member 82c. These core members, as described above, are configured with modules 110–113 in paired and stacked relationship. Note in FIG. 2 that the winding core portions of these core members support two as opposed to a single field winding. In this regard, core member 82g is seen supporting field windings 150g and 152g. Field winding 150g is wound about the receiver troughs 132' and 132" of respective modules 110 and 111, while field winding 152g is wound about receiver troughs 132''' and 132'''' of respective modules 112 and 113. Similarly, field winding 150c is seen wound about receiver troughs 132' and 132" at core member 82c and additionally the field winding 152c is shown wound about receiver troughs 132''' and 132'''' of that core member. Conventional brushless motor architecture will incorporate a single winding for each core member as at 82a–82i. Where the core members are formed, for example, utilizing conventional thin laminations, larger gage field winding wire is necessitated because of the single winding per stator pole member and the accumulated winding bundle will protrude above and below the core members. By virtue of the utilization of net shaped modules 110–113, receiver troughs as at 132'–132'''' can be employed which fully incorporate the field winding wire bundles, i.e., the outermost level of field winding wire is spaced inwardly from back iron and flux interaction outer tip or top surface regions as shown respectively at 116'–116'''' and 120'–120''''. Because two windings are incorporated with each core member 82a–82i and if the windings are connected in parallel the current carried by each field winding is, in effect, reduced by 50% and, thus, the gauge thickness of the wire may be reduced proportionally. Also the machine winding time is greatly reduced because the axial length over which the winder must reach is cut in half in this embodiment.

FIGS. 2 and 3 reveal that an electrically insulative, polymeric shield is positioned within each of the receiver troughs 132'–132'''' intermediate the winding core and an associated field winding. In this regard, shields are shown in section in FIG. 3 at 154a–154i. Shield 154g is revealed in position over receiving trough 132' in FIG. 2. Similarly, shield 154c also is shown associated with module 110. FIG. 2 reveals shields 156c and 156g located within receiver trough 132" in conjunction with module 111. Shields 158c and 158g are revealed as installed within receiver troughs 132'''; and shields 160c and 160g are shown installed within receiver troughs 132''''. FIG. 2 further reveals that that portion of the shield adjacent the back iron portion of the stator core member extends to an outer tip or top surface region and defines an outwardly open channel configured to carry lead out and lead in components of field winding wire. For a multiphase architecture, it is necessary to interconnect these windings and thus a non-interfering intercommunicating arrangement be developed. Note, that channels 162c and 162g are formed within respective shields 154c and 154g. Similarly, outwardly open channels are shown at 164c within shield 156c and at 164g in shield 156g. An outwardly open channel is seen at 166c in shield 158c and at 166g in shield 158g. Finally, an outwardly open channel 168c is formed within shield 160c and an outwardly open channel 168g is seen formed within shield 160g.

The receiving troughs and associated shields are configured to carry windings below the noted tip or top surface regions of the back iron portions and flux interaction portions and thus permit module stackability. Additionally, FIGS. 2 and 5 reveal another feature of the device architecture, note that the winding core bottom surface regions identified at 130'–130'''' are recessed inwardly from the associated flux interaction bottom surface regions 122'–122'''' and back iron bottom surface regions 118'–118''''. These recesses are provided to achieve the desired amount of winding core cross-section area. It may be recalled that the design of the motors calls for utilizing thicknesses and lengths for the modules 110–113 which are appropriate to avoid flux saturation phenomena and to incorporate a suitable safety factor. However, beyond those criteria no additional materials are utilized. Therefore, recesses may not be necessary and should not be considered limiting. Accordingly, the modular stacking design at hand within modules 110–113 is one permitting a highly efficient utilization of the pressure shaped processed ferromagnetic particles.

Figure 6:
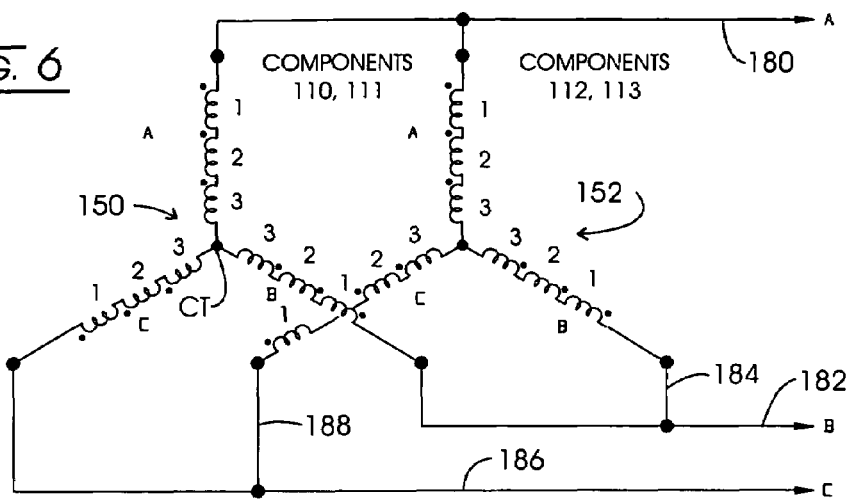
FIG. 6 is an electrical schematic diagram showing the parallel association of two "Y" winding configurations employed with the stator structure of FIG. 5.

Turning now to the configuration of the windings 150a–150i provided with modules 110 and 111, reference is made to FIG. 6. In the figure, the windings at modules 110–111 are represented in general at 150 and the windings associated with modules 112 and 113 are represented in general at 152. The three phases of these windings further are identified at branches A, B, and C and the winding positions are identified by the numeration 1, 2, and 3. These "Y" windings are connected in parallel. In this regard, note that phase A of windings 150 and 152 are commonly connected to line 180 which additionally is labeled as a phase "A". Phase B of windings 150 is coupled to line 182, while the corresponding phase B of windings 152 are coupled via line 184 to line 182. Finally, phase C of windings 150 is coupled to line 186 while the corresponding phase C of windings 152 is coupled to line 186 via line 188. Thus, phases A, B, and C at respective lines 180, 182 and 186 extend to the printed circuit board 66 as shown in FIG. 2.

Figure 8:
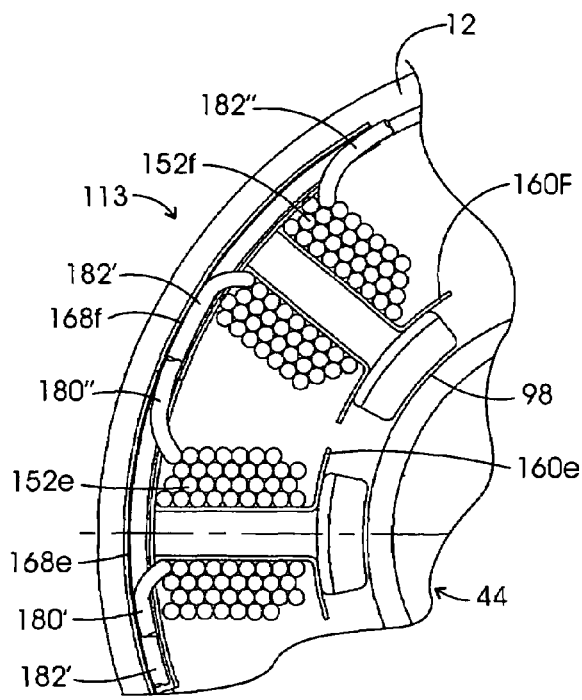
FIG. 8 is a partial sectional view of electrodynamic apparatus according to the invention showing interpole winding geometry.
Figure 7:
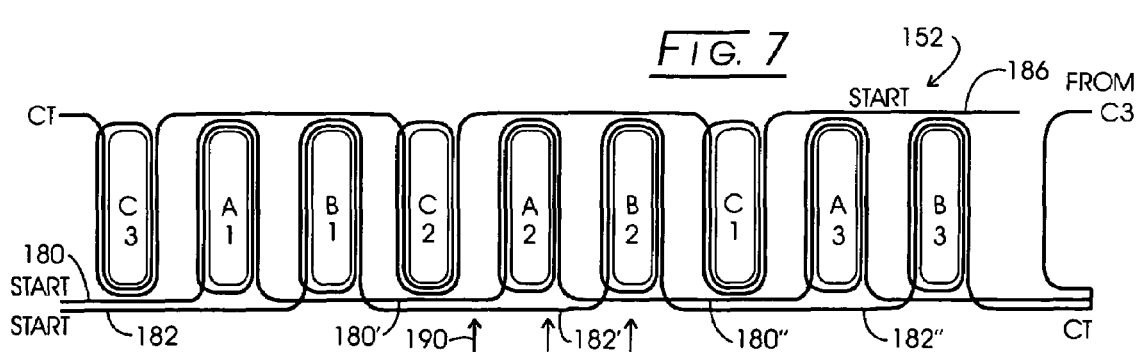
FIG. 7 is a schematic representation of a phase winding configuration.

Referring to FIG. 7, the geometric aspect for the winding of one of these Y structures, for example, at 152 is schematically revealed. In the figure, the nine windings are identified in the manner of FIG. 6, i.e., being shown as C1, C2, C3, A1, A2, A3, and B1, B2, and B3. Lines 180, 182, and 186 are reproduced in FIG. 7 and the windings are represented showing clockwise rotation of the wire from the start lead to the center tap where the windings join in common as the center of the Y architecture. Now looking to the partial sectional end view of the motor 10 in FIG. 8, windings A2 and B2 are represented. The figure represents these windings from a schematic standpoint in the direction represented by the viewing directional arrow 190 in FIG. 7. Referring additionally to that figure, the start of the winding B2 and, correspondingly the finish of winding B1 is represented at 182' in both figures. Note that the winding is within outwardly open channel 168e. Correspondingly, the start of winding A2 and correspondingly the finish of winding A1 is represented at 180' extending from channel 168e. The finish of winding A2 is represented in both figures at 180'' while the start of winding B2 again is identified at 182' exiting from channel 168f. Finally, the finish of winding B2 is represented in FIGS. 7 and 8 at 182''. The manufacturing procedures for carrying out these windings are substantially simplified and improved by virtue of the reduced axial winding length for each "Y" winding 152 and 150 as provided by the combination of modules 112 and 113 and 110 and 111.

Figure 9:
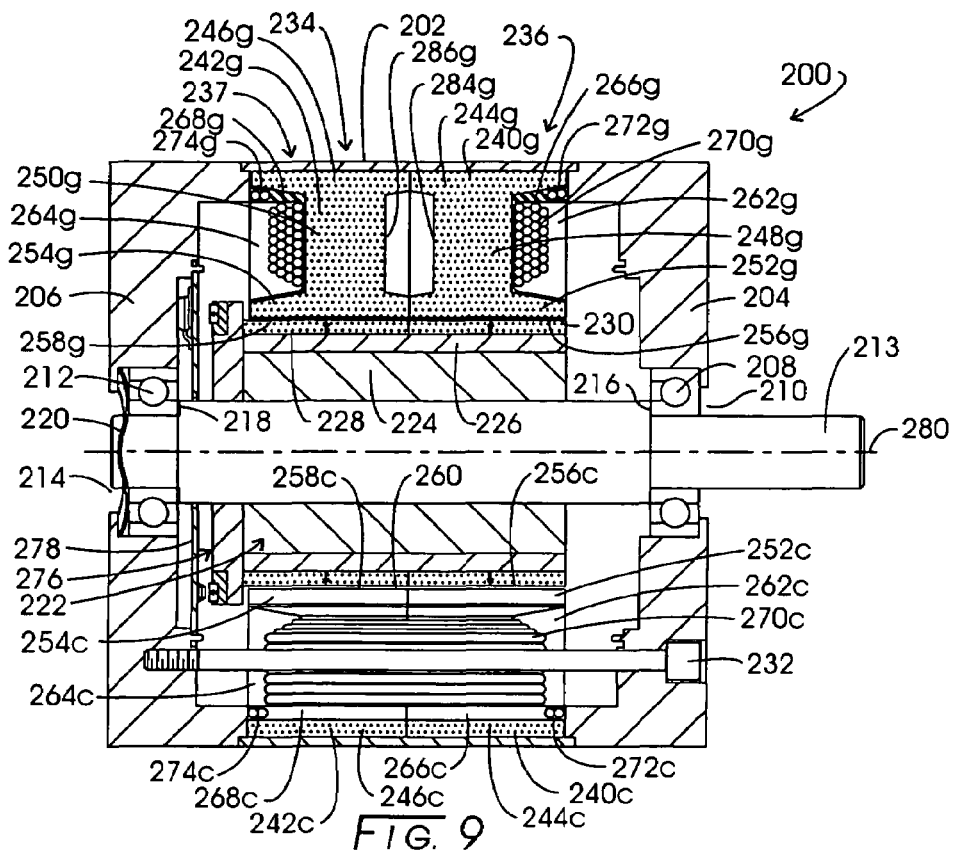
FIG. 9 is a sectional view of another electrodynamic apparatus structuring according to the invention.

This approach of achieving higher power motors through the combining of components or modules to form the field wound stator is uniquely suited to powder metal technology. Since the module design is optimized for uniting the requirements of the powder metal pressing industry and the electrical requirements of the motor design under consideration the total number of modules may vary. Also, the stacking ability of the modules yields a versatility to the motor design unavailable with a typical steel lamination motor design. Referring to FIG. 9, a version of the motor or electrodynamic apparatus limited to two modules is represented in general at 200. The similarity of the architecture of device 200 with that of electrodynamic apparatus or motor 10 becomes immediately apparent. In this regard, the motor is configured with an aluminum cylindrical sleeve 202, the ends of which are joined to cylindrical end caps 204 and 206. A bearing 208 is mounted within end cap 204 adjacent a shaft opening 210. Similarly, a bearing 212 is installed within end cap 206 adjacent opening 214. Bearings 208 and 212 support motor shaft 213, their inner raceways being rotatably engaged with respective shoulders 216 and 218 of the shaft. Shaft 213 is disposed about axis 280. A wavy washer 220 loads the outer race of bearing 212 into appropriate position. Shaft 213 supports a rotor represented generally at 222 formed having an aluminum inner core 224, a cylindrical back iron 226 and cylindrical permanent magnet or rotor pole region 228 extending outwardly to a cylindrical flux confronting surface 230. The assemblage of end caps 204 and 206, sleeve 202 and the shaft 213 is retained together, as before, by a sequence of machine screws, one of which is revealed at 232.

Motor 200 is configured with an annular stator assembly represented generally at 234, the stator portion of which is formed of two annular modules formed of pressure shaped processed ferromagnetic particles and here represented in general at 236 and 237. Note that the profiles of components 236 and 237 are identical to those described earlier at 110 and 111 or 112 and 113. Using the identifying convention of the earlier figures, for a nine stator pole embodiment, stator pole core members 240c and 240g of module 236 are revealed. In similar fashion, core members 242c and 242g are illustrated in connection with module 237. As before, each of these modules is net shaped with back iron portions as shown respectively at 244c, 244g and 246c, 246g. The back iron portions are integrally formed with the winding core portions of the stator pole core members as seen at 248g and 250g. Those winding core portions are, in turn, integrally formed with flux interaction portions as at 252c, 252g and 254c, 254g. These flux interaction portions extend to arcuate flux interaction surfaces as at 256c, 256g in the case of module 236 and at 258c, 258g for the case of module 237.

The surfaces define, with the flux confronting surface 230 of rotor 222 a functioning or working air gap 260. Note that as in the case of earlier embodiments, both the back iron portions and flux interaction portions of the core components extend to coplanar top and bottom surface regions. The bottom surface disposed tip regions are located in mutual adjacency and alignment while the top surface regions extend to define receiver troughs as represented at 262c, 262g for module 236 and at 264c, 264g as illustrated in connection with module 237. In each receiver trough, the winding core portions support a polymeric electrically insulative shield, each configured in the manner described above in connection with motor 10. Note that polymeric shields 266c, 266g are positioned within respective receiver troughs 262c and 262g while polymeric shields 268c, 268g are located within respective receiver troughs 264c, 264g. Field windings are shown, as before, at 270c, 270g, the winding starts and finishes thereof being carried about the motor via outwardly open channels formed within the shields 266c, 266g and 268c, 268g. Those open channels are represented, for instant illustration at 272c, 272g and 274c, 274g. As before, motor 200 incorporates a sensible system having a disc form and represented generally at 276 which performs in conjunction with printed circuit board mounted control circuit sensors. Such a printed circuit board is represented in general at 278. A preferred sensible system and sensor implementation for the motor as disclosed herein is described in a co-pending application for United States patent by Petersen entitled "Multi-Phase Motors With Single Point Sensing Based Commutation" (supra).

As in the previous embodiment, winding core regions 284g and 286g are recessed to help achieve the desired electrical characteristics while retaining a suitable safety factor in overall winding core area. Additionally, some material and weight economies are also achieved. It should be noted that the recesses 284g and 286g as well as recesses in the winding core bottom surface; 130'–130''' in the previous equipment are not required for proper or efficient motor assembly and may not be a necessary feature when designing for the optimum electrical characteristics, but are shown as an optional design feature available with pressed powder technology and suitable for many applications.

Figure 10:
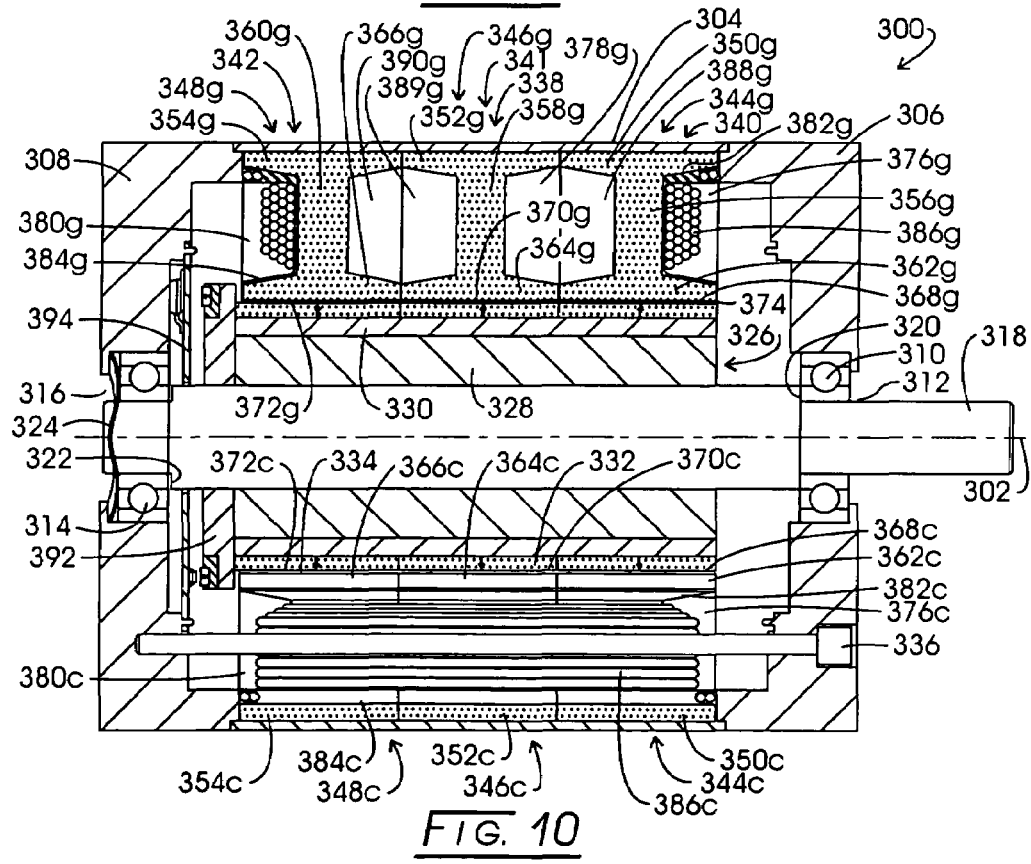
FIG. 10 is a sectional view of another electrodynamic apparatus stator component structuring according to the invention.

Referring to FIG. 10, a motor or electrodynamic device represented generally at 300 is shown having an elongated architecture extending along its motor axis 302. Device 300 represents a design wherein a stator assembly and associated rotor are of greater lengthwise extent along axis 302 as compared with the lengthwise extent of motor 200 along axis 280 (FIG. 9). To achieve this desired extra length without excessive widthwise extents of the stator core components mandated by the above discussed pressed molding procedures, the stator is formed with three free-form components with lengths along axis 302 suited to achieve appropriate net shaping without excess thickness. As in the case of motors or electrodynamic devices 10 and 200, motor 300 is formed with a aluminum cylindrical sleeve 304 the axially oppositely disposed ends of which are coupled with identical end caps 306 and 308. End cap 306 is configured to support a bearing 310 at a shaft opening 312 and, correspondingly, a bearing 314 is mounted within end cap 308 adjacent opening 316. Bearings 310 and 314 support a rotor shaft 318, the shoulders of which at 320 and 322 are engageable with the bearing internal raceways. A wavy washer 324 functions to load the external race of bearing 314 inwardly. Shaft 318 supports a rotor represented generally at 326 having a cylindrical aluminum inner core 328, the outer cylindrical surface of which supports a cylindrical rotor back iron 330. Rotor back iron 330, in turn, supports cylindrical permanent magnet 332 defining a sequence of, for example, six rotor poles and providing a flux confronting surface 334. As before, the device assemblage is interconnected utilizing a sequence of machine screws, one of which is revealed at 336.

The stator assembly for motor or device 300 is represented generally at 338 and is seen to be structured having three pre-formed stator core module components 340–342. Again utilizing the descriptive approach employed with motor or device 10 in FIG. 2, stator pole core members 344c, 344g are shown in conjunction with module component 340. Stator pole core members 346c, 346g are shown associated with module component 341, and stator pole core members 348c, 348g are shown associated with module component 342. Core members 344c, 344g are shown formed integrally with respective back iron portions 350c, 350g. Core members 346c, 346g are shown formed integrally with respective back iron portions 352c, 352g, and core members 348c, 348g are shown formed integrally with respective back iron portions 354c, 354g. These back iron portions are integrally formed with winding core portions extending therefrom. In this regard, core member 344g is shown having a winding core portion 356g. Core member 346g is shown having a winding core portion 358g and core member 348g is shown having an integrally formed winding core portion 360g. These winding core regions are formed integrally with flux interaction portions. In this regard, core members 344c, 344g incorporate respective flux interaction portions 362c, 362g. Core members 346c, 346g incorporate respective flux interaction portions 364c, 364g, and core members 348c, 348g incorporate respective flux interaction portions 366c, 366g. The flux interaction portions extend to define arcuate flux interactions surfaces. In this regard, flux interaction portions 362c, 362g define respective flux interaction surfaces 368c, 368g. Flux interaction portions 364c, 364g extend to form respective arcuate flux interaction surfaces 370c, 370g and flux interaction portions 366c, 366g extend to form respective flux interaction surfaces 372c, 372g. These flux interaction surfaces cooperate with the corresponding rotor flux confronting surface 334 to define a functional or working gap 374.

Each of the stator pole core members of each module 340–342 is configured with an inwardly depending receiver trough from each axial surface. For example, receiver troughs 376c, 376g and 388g are formed within respective core members 344c, 344g of module 340. Centrally disposed core members as at 346g also are formed having an identical receiver trough as represented at 378g and 389g, and core members 348c, 348g are seen to have respective receiver troughs 380c, 380g and 390g. For the present embodiment electrically insulative polymeric shields are inserted over the winding core portion in the outboard or outwardly opening receiver troughs of the module assembly. In this regard, shields 382c, 382g are inserted within respective receiver troughs 376c, 376g and shields 384c, 384g are inserted within respective receiver troughs 380c, 380g. Shields 382c and 384c are seen to support a more elongate field winding 386c. Similarly, shields 382g and 384g are seen to support field winding 386g.

As illustrated on the C numerated side of FIG. 10 the field winding encompasses all three stator pole core members 344c, 346c and 348c coupling them together magnetically. The figure also reveals the formation of recesses on the bottom surfaces of each of the end module stator pole core members and on both surfaces of the center module. For example, such recesses are revealed at 378g, 388g, 389g and 390g. As before, the recesses function to permit fabrication of the winding core regions to satisfy the electrical design requirements of the motor and to an extent sufficient to avoid saturation and provide a reasonable factor of safety. Note that the recesses formed on the top and bottom surface regions of the winding core portion of each core member of each stator module are identical in this embodiment.

Motor 300 also contains a sensible system represented as a disc at 392 which cooperates with a sensor arrangement and control circuit at a printed circuit board 394.

In the embodiment presented herein the individual stator core modules can be purposely slightly angularly misaligned or skewed within the cylindrical outer sleeve resulting in an offset between adjacent stator pole core members of adjacently stacked core modules yet still permitting the winding operation to occur in the same manner as if each individual stator core module was perfectly angularly aligned. This misalignment can be used in certain motor designs to reduce the effects of cogging or detent torque where desirable or required.

As the instant electrodynamic apparatus structures reach larger sizes the module components forming the stator structure may themselves be segmented, again to accommodate for the severe molding requirements at hand as well as to facilitate the winding of field coils about the winding core regions. One such segmentation approach is illustrated in connection with FIGS. 11 and 12. Looking to FIG. 11, a motor represented generally at 400 is shown in a sectional portrayal similar to that seen in FIG. 3. In this regard, the section is taken through a module component represented generally at 402 and seen additionally in perspective fashion in FIG. 12. Component 402 is formed with nine stator pole core member assemblies represented generally at 404a–404i. Stator pole assemblies 404a–404i are formed with corresponding pressed powder net shaped stator pole core members represented generally at 406a–406i as seen additionally in FIG. 12. Each of the core members 406a–406i is formed, as before, integrally with back iron portions 408a–408i from which emanate the winding core portions shown respectively at 410a–410i which, in turn, are integrally formed with respective flux interaction portions 412a–412i. The flux interaction portions 412a–412i extend respectively to arcuate flux interaction surfaces 414a–414i. A rotor is represented generally at 416 structured in the same manner as rotor 44 described in connection with FIGS. 1–3. This rotor extends to a flux confronting surface and is spaced from flux interaction portions 412a–412i to define a working or functional gap 420. Component retention is provided by a sequence of machine screws in the same manner as described in connection with motor 10. In this regard, sectional representations of three such machine screws are provided at 421–423.

Figure 11:
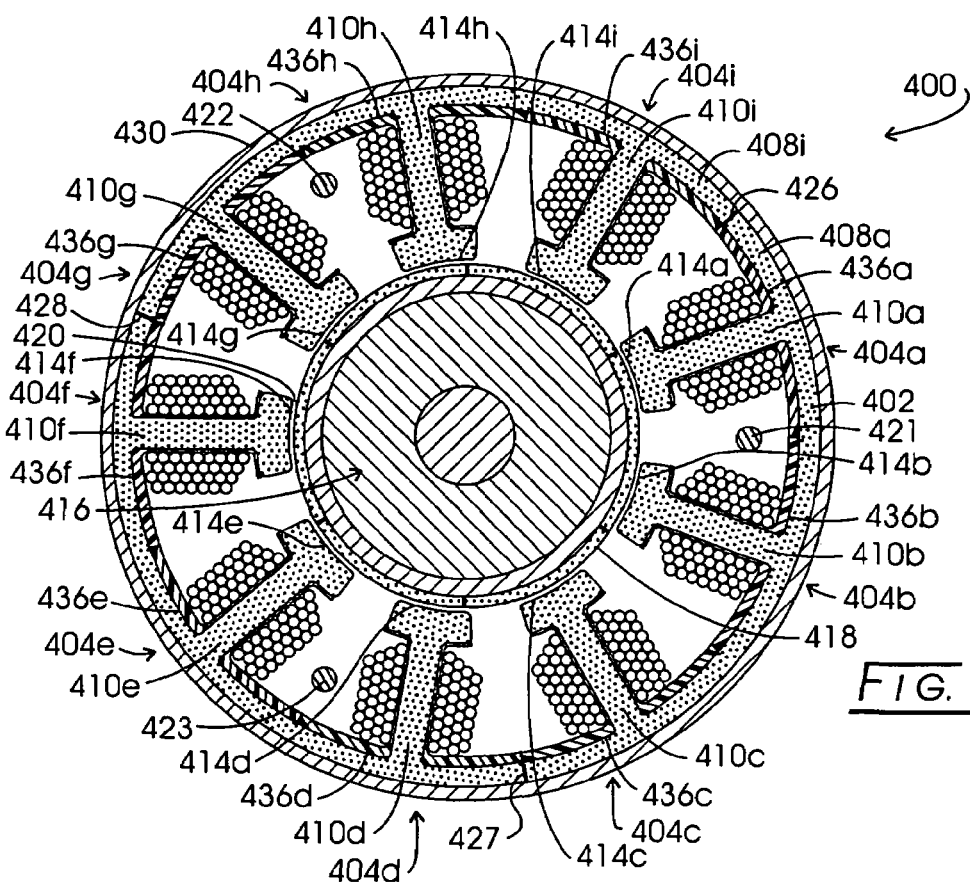
FIG. 11 is a sectional view of a electrodynamic apparatus structure having a segmented stator core architecture.

Note that component 402 is not net shaped as a unit but is pre-formed in three arc shaped segments which are joined together in mutual abutment at edge locations 426–428. This form of abutment is intimate and touching inasmuch as the resultant three segments reside in flux transfer communication. Three segments are maintained in their arch-like structural orientation by the outer cylindrical sleeve 430 seen in FIG. 11. The three segments, identified in general at 432–434 are seen in FIG. 11 to be associated with insulating sleeve and field winding combinations 436a–436i. Preferably, the field windings are mounted upon the stator pole core members 406a–406i as they exist in the segments 432–434. In certain rotor pole, stator pole, pair arrangements such as a nine pole stator and an eight pole rotor the three windings of each phase are wound on adjacent poles meaning A1, A2, A3, B1, B2, B3 and C1, C2, C3 as one proceeds around the stator. This winding form could be enhanced with the stator arrangement of FIGS. 11 and 12 since the multiple stacked core components or modules of a single phase could be pre-wound prior to assembly into sleeve 430.

Figure 12:
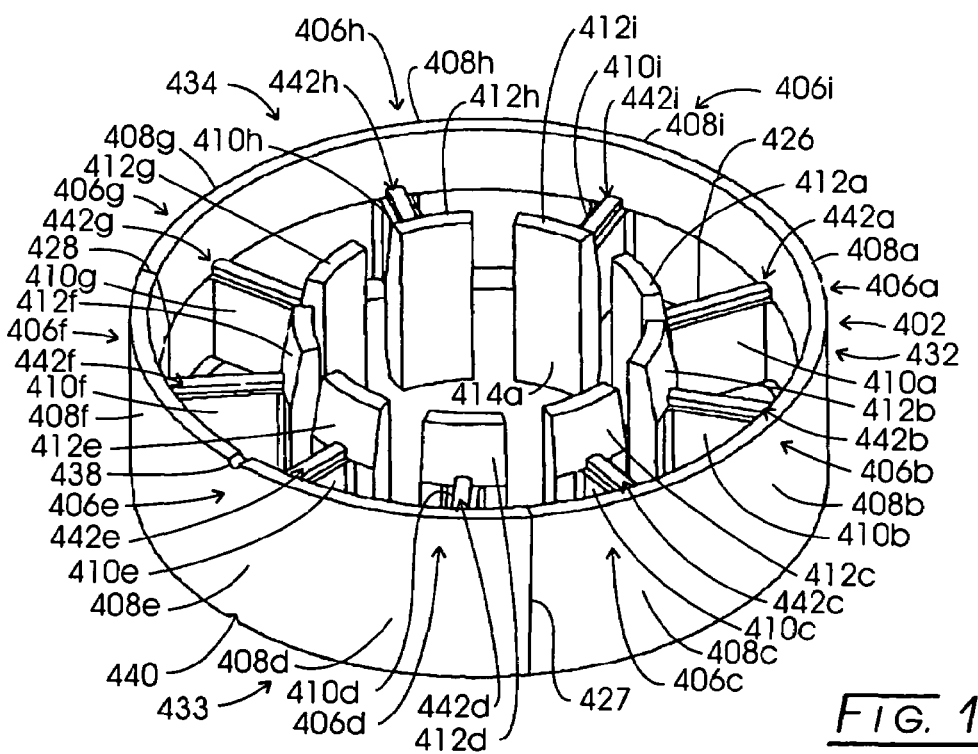
FIG. 12 is a perspective view of a stator core component architecture shown in FIG. 11.

Note additionally in FIG. 12 that alignment notches are provided, for example as shown at 438 and 440 in segment 433. The figure further reveals the provision of receiver troughs 442a–442i at respective winding core portions 410a–410i.

Figure 13:
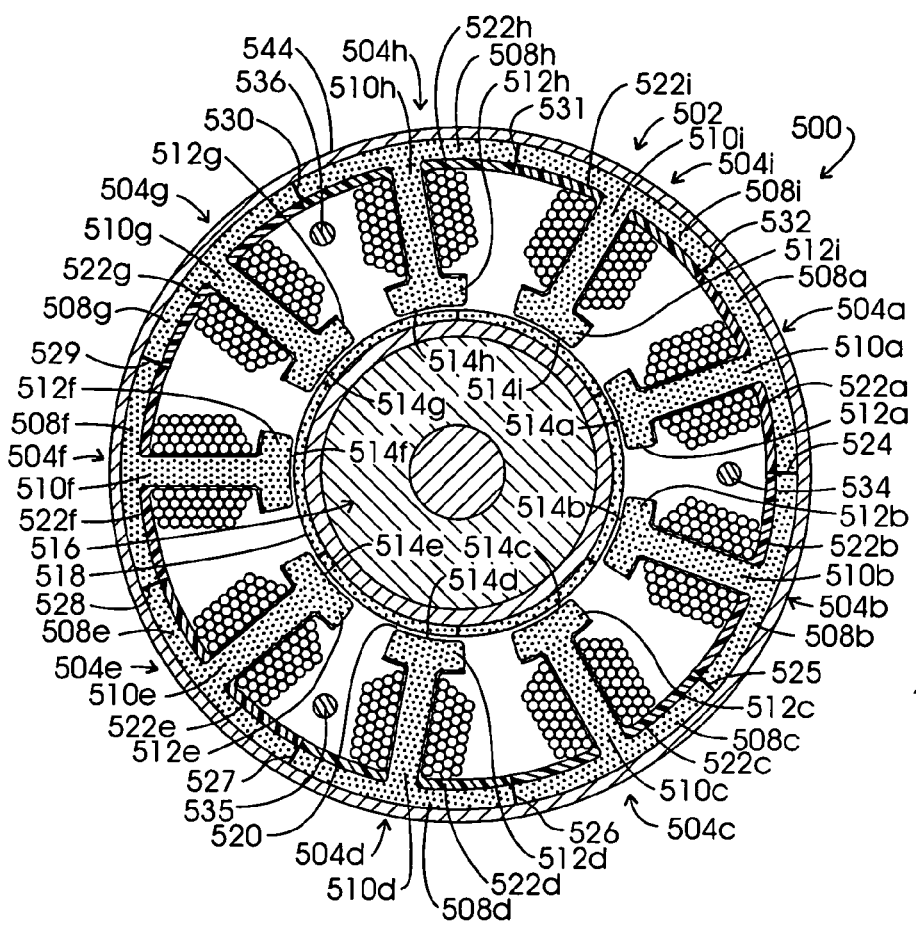
FIG. 13 is a sectional view of apparatus according to the invention showing a multi-segmented stator core component architecture.
Figure 14:
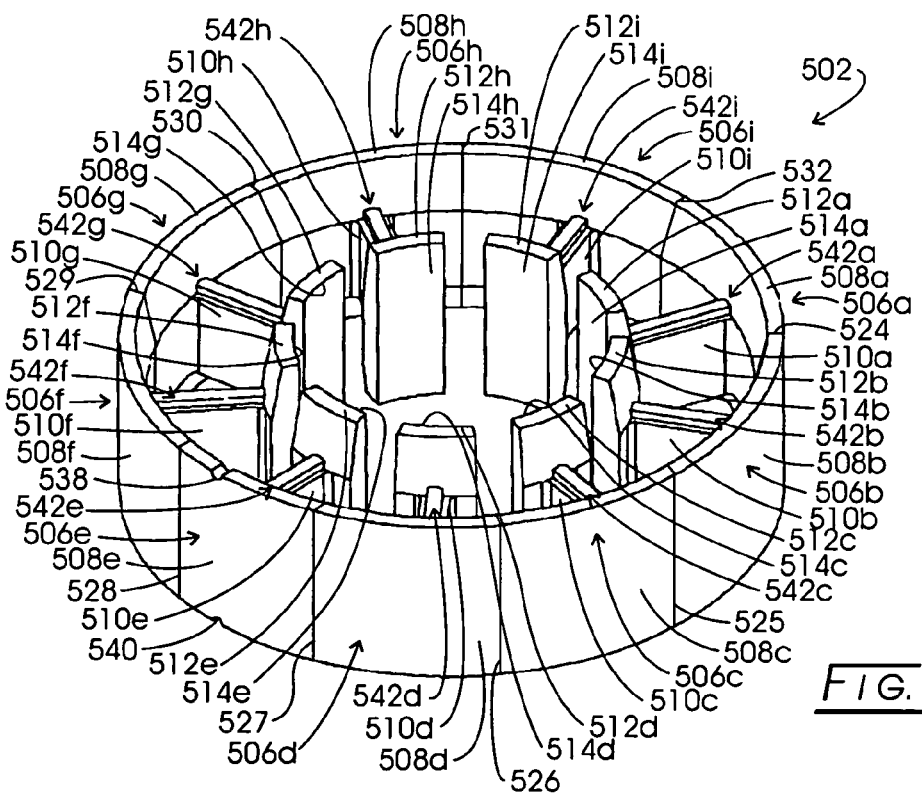
FIG. 14 is a perspective view of a stator core component as depicted in connection with FIG. 13.

Looking to FIGS. 13 and 14, an architecture is presented wherein a single component is formed of nine segments in a nine stator pole assembly configuration. This form of construction would only be applicable on larger motor types since assembly of multiple segments is first required prior to assembly of the stacked modules to complete a single stator assembly such as shown in FIGS. 9 and 10. In FIG. 13, motor or device 500 is represented in sectional format in the manner of FIGS. 3 and 11. Correspondingly, FIG. 14 shows in perspective a multi-segmented module which is provided in conjunction with the sectional locations on the motor 500 shown in FIG. 13. Looking to that figure, motor or device 500 is seen to be comprised of nine distinct stator pole assemblies 504a–504i. As represented additionally in FIG. 14, these stator pole assemblies 504a–504i are configured with corresponding and respective stator pole core members 506a–506i. As before, each of the stator pole core members 506a–506i is formed integrally with a back iron portion as represented in FIG. 13 respectively at 508a–508i. Integrally formed therewith and extending radially inwardly from the back iron portions 508a–508i are respective winding core portions 510a–510i. These winding core portions which are recessed as seen in FIG. 14, extend radially inwardly to and are formed integrally with flux interaction portions shown respectively at 512a–512i. The flux interaction portions 512a–512i extend radially inwardly to define arcuate flux interaction surfaces shown respectively at 514a–514i.

The rotor of motor or device 500 is represented in general at 516 and is configured in the same manner as rotor 44 described in connection with FIGS. 2 and 3. The rotor extends radially outwardly to provide a flux confronting surface 518 which in turn, cooperates with flux interaction surfaces 514a–514i to define a working or functional gap 520. Each of the stator pole core members 506a–506i is provided with a polymeric electrically insulative shield over the winding core portion interfacing with the associated winding combination as shown in general at 522a–522i within respective stator pole assemblies 504a–504i.

FIGS. 13 and 14 reveal that the module 502 is formed of nine discrete segments, the edges of the back iron portions of which are abutted together in flux transfer relationship at nine locations shown at 524–532. Thus, each segment is configured with a singular component stator core assembly. In this regard, it may be recalled that at least two axially stacked modules are called for in this axially modular form of optimized large motor construction. As in the case of component 402 described in connection with FIGS. 11 and 12, the segments are assembled in compression along their back iron portions to evolve an arch form of structure exhibiting desirable structural integrity. The back iron components are retained in their appropriate orientation by cylindrical sleeve 544 seen in FIG. 13. As described in connection with motor 10, motor 400 module components, end caps and cylindrical sleeve are retained in position by a sequence of three machine screws, sectional representation of which are shown in FIG. 13 at 534–536. It should be noted that there are other suitable means of securing the final assembly of the end caps and the stator module assemblies other than the aforementioned machine screws and therefore their use in the embodiments presented herein should not be considered in a limiting sense. One segment, for example, that representing a back iron portion and a stator pole core member 506e is configured having alignment notches as at 538 and 540 to aid in assembly of the entire stator core as described in connection with FIG. 5. Note additionally in FIG. 14 that the motor axial length of the winding core portions 510a–510i is diminished, inter alia, to define receiver troughs shown respectively at 542a–542i.

Since certain changes may be made in the above-described apparatus and method without departing from the scope of the invention herein involved, it is intended that all matter contained in the description thereof or shown in the accompanying drawings shall be interpreted as illustrative and not in a limiting sense.

What is claimed is:

1. Electrodynamic apparatus comprising:
    a rotor having a permanent magnet surface extending a rotor length along an axis between rotor end locations;
    a stator assembly disposed about said axis comprising:
    a first stator core module formed of pressure shaped processed ferromagnetic particles which are generally mutually insulatively associated, said first core module comprising a back iron portion and a plurality of stator pole core members each formed integrally with said back iron portion said back iron portion having a back iron widthwise extent and back iron length extending from a bottom surface to a top surface, said backiron length being determined as a function of said widthwise extent and manufacturing criteria of pressure shaping, each said core member having a winding core portion having a core widthwise extent, and extending a core length between bottom and top winding core surfaces, and a flux interaction portion having an interaction widthwise extent, integrally formed with said winding core portion, having a flux interaction surface spaced from said rotor surface to define at least a portion of a working gap and extending an interaction length from an interaction top surface to an interaction bottom surface, and
    a second stator core module formed of pressure shaped processed ferromagnetic particles which are generally mutually insulatively associated, said second core module comprising a back iron portion and a plurality of stator pole core members, each formed integrally with said back iron portion, said back iron portion having a back iron widthwise extent and extending a back iron length from a bottom surface to a top surface, said backiron length being determined as a function of said widthwise extent and manufacturing criteria of pressure shaping, each said core member having a winding core portion having a core widthwise extent and extending a core length between bottom and top winding core surfaces, and a flux interaction portion having an interaction widthwise extent, integrally formed with said winding core portion, having a flux interaction surface spaced from said rotor surface to define at least a portion of a working gap and extending an interaction length from an interaction top surface to an interaction bottom surface;
    said bottom surfaces of said back iron portions of said first and second stator core modules being circumferentially aligned in mutually facing relationship about said axis with said backiron lengths combining in substantially abutting form to substantially equal said rotor length; and
    a field winding assembly comprising a plurality of wire windings extending over and supported from the generally axially aligned outward winding core surfaces of the winding core portions of said first and second stator core components.

2. The electrodynamic apparatus of claim 1 in which said stator assembly further comprises:
    at least one intermediate stator core module formed of pressure shaped processed ferromagnetic particles which are generally mutually insulatively associated said intermediate stator core module being similar in configuration and construction to said first and second stator core modules;
    said intermediate stator core module being located in circumferential alignment between said first and second stator core modules.

3. The electrodynamic apparatus of claim 2 in which:
    said intermediate stator core module stator pole core members are angularly aligned along said axis of said electrodynamic apparatus with said core members of said first and second stator core modules.

4. The electrodynamic apparatus of claim 2 in which:
    said intermediate stator core module stator pole core members are partially misaligned along said axis of said electrodynamic apparatus relative to said stator pole members of said first and second stator core modules.

5. The electrodynamic apparatus of claim 2 in which:
    each said first, second and intermediate stator core module comprises a combination of separately formed segments, each said segment including at least one said stator pole core member, said segments being arranged in mutually abutting flux transfer relationship to define a complete stator module.

6. The electrodynamic apparatus of claim 2 in which:
    the ratio of said back iron widthwise extent to said back iron length of each said stator core module back iron portion of each said stator core module is equal to or less than about 1 to 5.

7. The electrodynamic apparatus of claim 2 in which:
    the ratio of said winding core widthwise extent to said winding core length of each said stator pole core member of each said stator core module is equal to or less than about 1 to 5.

8. The electrodynamic apparatus of claim 1 in which:
    said first and second stator core modules stator pole core members are aligned along said axis of said electrodynamic apparatus.

9. The electrodynamic apparatus of claim 1 in which said stator assembly further comprises:
    at least one intermediate stator core module formed of pressure shaped processed ferromagnetic particles which are generally mutually insulatively associated, said intermediate core module comprising a back iron portion and a plurality of stator pole core members each formed integrally with said back iron portion, said back iron portion having a back iron widthwise extent and back iron length extending between first and second edge surfaces, said backiron length being determined as a function of said width wise extent and manufacturing criteria of pressure shaping, each said medial core members having a winding core portion having a medial core widthwise extent and extending a medial core length between third and fourth edge surfaces and a flux interaction portion having an interaction widthwise extent, integrally formed with said medial core portion, having a flux interaction surface spaced from said rotor surface to define at least a portion of a working gap and extending an interaction length between fifth and sixth edge surfaces;

said intermediate stator core module being located in aligned relationship between said first and second stator core modules wherein said back iron portion first edge surface is in mutually aligned facing relationship with said first stator core module back iron bottom surface, said interaction portion fifth edge surface is in mutually aligned facing relationship with said first stator core module interaction portion bottom surface, said back iron portion second edge surface is in mutually aligned facing relationship with said second stator core module back iron bottom surface, and said interaction sixth edge surface is in mutually aligned facing relationship with said second stator core module interaction portion bottom surface.

10. The electrodynamic apparatus of claim 9 in which:

said bottom surface of said back iron portion and said bottom surface of said flux interaction portion of said first stator core module reside in a common plane generally perpendicular to said axis; and said back iron portion first edge surface and said flux interaction portion fifth edge surface of said intermediate core module reside in a common plane generally perpendicular to said axis.

11. The electrodynamic apparatus of claim 10 in which:

said bottom surface of said back iron portion of said first stator core module is located in adjacency with said back iron portion first edge surface of said intermediate core module; and said bottom surface of said flux interaction portion of said first stator core module is located in adjacency with said flux interaction portion fifth edge surface of said intermediate core module.

12. The electrodynamic apparatus of claim 9 in which:

said bottom surface of said back iron portion and said bottom surface of said flux interaction portion of said second stator core module reside in a common plane generally perpendicular to said axis; and said back iron portion second edge surface and said flux interaction portion sixth edge surface of said intermediate core module reside in a common plane generally perpendicular to said axis.

13. The electrodynamic apparatus of claim 12 in which:

said bottom surface of said back iron portion of said second stator core module is located in adjacency with said back iron portion second edge surface of said intermediate stator core module; and said bottom surface of said flux interaction portion of said second stator core module is located in adjacency with said flux interaction portion sixth edge surface of said intermediate core module.

14. The electrodynamic apparatus of claim 1 in which:

said winding core length of each said stator pole core member of said first and second stator core modules is less than said back iron length and said flux interaction length to an extent defining an outwardly open receiver trough exhibiting a depth for receiving said field winding assembly wire windings against a said winding core surface to an extent effective to enhance electromagnetic coupling between said field winding assembly and said first and second core modules.

15. The electrodynamic apparatus of claim 14 in which:

each said outwardly open receiver trough depth is of an extent effective to maintain said field winding assembly wire windings below the level of said back iron portion top surface and said interaction portion top surface.

16. The electrodynamic apparatus of claim 14 in which:

said stator assembly further comprises an electrically insulative shield interposed intermediate said plurality of wire windings and the outwardly disposed winding core surfaces of the winding core portion of each said stator pole core member of said first and second stator core modules, each said shield extending within a said receiver trough to adjacency with a said back iron portion top surface to define an outwardly open channel for supporting phase defining wire association among said plurality of wire windings.

17. The electrodynamic apparatus of claim 14 in which:

said bottom surface of said back iron portion and said bottom surface of said flux interaction portion of each said stator pole core member of said first and second stator core modules reside in a common plane generally perpendicular to said axis.

18. The electrodynamic apparatus of claim 1 in which:

the ratio of said back iron widthwise extent to said back iron length of each said stator core module back iron portion of said first and second stator core modules is equal to or less than about 1 to 5.

19. The electrodynamic apparatus of claim 1 in which:

the ratio of said winding core widthwise extent to said winding core length of each said stator pole core member of said first and second stator core modules is equal to or less than about 1 to 5.

20. The electrodynamic apparatus of claim 1 in which:

the ratio of said flux interaction widthwise extent to said interaction length of each said stator pole core member of said first and second stator core modules is equal to or less than about 1 to 5.

21. The electrodynamic apparatus of claim 1 in which:

each said first and second stator core module comprises a combination of separately formed segments, each said segment including at least one said stator pole core member and associated said back iron portion, said segments being arranged in mutually abutting flux transfer relationship to define a complete stator module.

22. The electrodynamic apparatus of claim 21 in which:

said segments of said stator core modules comprise three adjacent said stator pole core members with associated said back iron portions in which each axially stacked segment array of three, when wound, contains three phase coils (A1, A2, A3; B1, B2, B3; C1, C2, C3) of an individual phase of said electrodynamic apparatus; and said rotor of said electrodynamic apparatus contains eight permanent magnet magnetized poles for every nine stator pole core members in a circumferential array.

23. The electrodynamic apparatus of claim 21 in which:

said stator core modules are comprised of three segments, said segments containing multiples of three said stator pole core members with associated said back iron portions.

24. The electrodynamic apparatus of claim 23 in which:

said segments of said first and second stator core modules are aligned in assembly and contain the phase coil windings of one phase of an assembly of three phases of said electrodynamic apparatus.

25. The electrodynamic apparatus of claim 1 in which:
said stator assembly further comprises:
a third stator core module formed of pressure shaped processed ferromagnetic particles which are generally mutually insulatively associated, said third stator core module comprising a back iron portion and a plurality of stator pole core members each formed integrally with said back iron portion said back iron portion having a back iron widthwise extent and back iron length extending from a bottom surface to a top surface, said backiron length being determined as a function of said widthwise extent and manufacturing criteria of pressure shaping, each said core member having a winding core portion having a core widthwise extent and extending a core length between bottom and top winding core surfaces, and a flux interaction portion having an interaction widthwise extent, integrally formed with said winding core portion, having a flux interaction surface spaced from said rotor surface to define at least a portion of a working gap and extending an interaction length from a top surface to a bottom surface, and
a fourth stator core module formed of pressure shaped processed ferromagnetic particles which are generally mutually insulatively associated, said fourth core module comprising a back iron portion and a plurality of stator pole core members each formed integrally with said back iron portion said back iron portion having a back iron widthwise extent and extending a back iron length from a bottom surface to a top surface said backiron length being determined as a function of said widthwise extent and manufacturing criteria of pressure shaping, each said core member having a winding core portion having a core widthwise extent, and extending a core length between bottom and top winding core surfaces, and a flux interaction portion having an interaction widthwise extent, integrally formed with said winding core portion, having a flux interaction surface spaced from said rotor surface to define at least a portion of a working gap and extending an interaction length from a top surface to a bottom surface;
said bottom surface of said back iron portions of said third and fourth stator core modules being circumferentially aligned in mutually facing relationship about said axis; and
said third and fourth stator core modules being circumferentially aligned about said axis with said first and second stator core modules to support a said field winding assembly.

26. The electrodynamic apparatus of claim 25 in which:
said stator pole core members of each of said first to fourth stator core modules are axially misaligned progressively along said axis from said first said core module to said fourth core module effectively to reduce the cogging or detent forces that would be present if said stator pole core portions of each said stator core module were axially aligned.

27. The electrodynamic apparatus of claim 25 in which:
said stator pole core members of each said stator core module from first to fourth are arranged in axial alignment along said axis.

28. The electrodynamic apparatus of claim 25 in which:
said field winding assembly comprises a first said plurality of wire windings supported from the generally axially aligned top winding core surfaces of the winding core portions of said first and second stator core modules, and a second plurality of wire windings supported from the generally axially aligned outwardly disposed top winding core surfaces of the winding core portions of said third and fourth stator core modules.

29. The electrodynamic apparatus of claim 28 in which:
said field winding assembly first plurality of wire windings is coupled in electrical parallel relationship with said second plurality of wire windings.

30. The electrodynamic apparatus of claim 28 in which:
said winding core length of each said stator pole core member of said first and second and third and fourth stator core modules is less than said back iron length and interaction length to an extent defining an outwardly open receiver trough exhibiting a depth for receiving respective said first and second plurality of wire windings against outward facing said top winding core surfaces to an extent effective to enhance electromagnetic coupling between said field winding assembly and said first and second and third and fourth stator core modules.

31. The electrodynamic apparatus of claim 30 in which:
each said outwardly open receiver trough defined in each stator pole core member of said first and second stator core modules exhibit a depth effective to maintain said field winding assembly first plurality of wire windings below the level of an adjacent outwardly disposed said back iron portion top surface and the outwardly disposed said interaction portion top surface and each said outwardly open receiver trough defined in each stator pole core member of said third and fourth stator core modules exhibits a depth effective to maintain said field winding assembly second plurality of wire windings below the level of an adjacent said back iron portion outwardly disposed top surface and the outwardly disposed said interaction portion top surface.

32. The electrodynamic apparatus of claim 31 in which:
the outwardly disposed said top surface of said back iron portion and the outwardly disposed said top surface of said flux interaction portion of each said stator pole core member of said first and second stator core modules reside in a common plane generally perpendicular to said axis; and
the outwardly disposed said top surface of said back iron portion and the outwardly disposed said top surface of said flux interaction portion of each said stator pole core member of said third and fourth stator core module reside in a common plane generally perpendicular to said axis.

33. The electrodynamic apparatus of claim 32 in which:
the outwardly disposed said top surface of said back iron portion of said second stator core module is located in adjacency with the outwardly disposed said top surface of said back iron portion of said third stator core module.

34. The electrodynamic apparatus of claim 30 in which:
said stator assembly further comprises an electrically insulative shield interposed intermediate said first and second plurality of wire windings and the said outward support surface of said winding core portion of each said stator pole core member of said first, second, third and fourth stator core components each said shield extending within a said receiver trough to adjacency with a said back iron portion outward surface to define an outwardly open channel for supporting wire association among said first plurality of wire windings and for supporting wire association among said second plurality of wire windings.

35. The electrodynamic apparatus of claim 25 in which:
said first and second core modules and said third and fourth core modules are arranged in axially abutting relationship along said axis.

36. The electrodynamic apparatus of claim 25 in which:
the ratio of said back iron widthwise extent to said back iron length of each said stator core module back iron portion of said first, second, third and fourth stator core modules is equal to or less than about 1 to 5.

37. The electrodynamic apparatus of claim 25 in which:
the ratio of said winding core widthwise extent to said winding core length of each said stator pole core member of said first, second, third and fourth stator core modules is equal to or less than about 1 to 5.

38. The electrodynamic apparatus of claim 25 in which:
the ratio of said flux interaction widthwise extent to said interaction length of each said stator pole core member of said first, second, third and fourth stator core modules is equal to or less than about 1 to 5.

39. The electrodynamic apparatus of claim 25 in which:
each said first and second stator core module comprises a combination of separately formed segments, each said segment including at least one said stator pole core member and associated said back iron portion, said segments being arranged in mutually abutting flux transfer relationship to define a complete stator component; and each said third and fourth stator core module comprises a combination of separately formed segments, each said segment including at least one said stator pole core member and associated said back iron portion, said segments being arranged in mutually abutting flux transfer relationship to define a complete stator component.

* * * * *